(12) United States Patent
Boroughf

(10) Patent No.: US 9,677,708 B2
(45) Date of Patent: Jun. 13, 2017

(54) DISPOSABLE OIL CHANGE KIT

(71) Applicant: William Boroughf, Novi, MI (US)

(72) Inventor: William Boroughf, Novi, MI (US)

( * ) Notice: Subject to any disclaimer, the term of this patent is extended or adjusted under 35 U.S.C. 154(b) by 0 days.

(21) Appl. No.: 15/224,197

(22) Filed: Jul. 29, 2016

(65) Prior Publication Data
US 2016/0334059 A1   Nov. 17, 2016

Related U.S. Application Data

(63) Continuation of application No. 14/255,520, filed on Apr. 17, 2014, now Pat. No. 9,423,074.

(51) Int. Cl.
*F16N 31/00* (2006.01)

(52) U.S. Cl.
CPC .................. *F16N 31/004* (2013.01)

(58) Field of Classification Search
CPC ...... F16N 31/006; E04H 6/428; Y10T 428/23
USPC ..... 206/204; 220/571, 573, 560.02; 184/106
See application file for complete search history.

(56) References Cited

U.S. PATENT DOCUMENTS

| | | | |
|---|---|---|---|
| 4,930,644 A | 6/1990 | Robbins, III | |
| 5,042,683 A | 8/1991 | Shaw et al. | |
| 5,348,803 A | 9/1994 | Schlaemus et al. | |
| 5,351,931 A * | 10/1994 | Houben | D21F 13/02 162/382 |
| 6,378,639 B1 | 4/2002 | Murray | |
| 6,899,940 B2 | 5/2005 | Leriget | |
| 2011/0042383 A1 | 2/2011 | Boroughf | |
| 2013/0211358 A1 | 8/2013 | Kikkawa et al. | |

OTHER PUBLICATIONS

DOCK Disposable Oil Change Kit2 Consumer.

* cited by examiner

*Primary Examiner* — King M Chu
(74) *Attorney, Agent, or Firm* — Avery N. Goldstein; Blue Filament Law PLLC

(57) ABSTRACT

A tool for liquid disposal is provided for collecting liquids and for changing engine oil or other hydrocarbon containing products, whereby the liquid, spent oil, or hydrocarbon is encapsulated in a non-biodegradable substance rendering the kit safe for disposal in a non-hazard or controlled substance landfill. A disposable container with a diffuser may be composed of rows of apertures that are used to channel the liquid to all levels of the container so that liquids can be exposed to the maximum surface area of the non-biodegradable substance contained in layered pouches containing the absorbent for total encapsulation.

16 Claims, 3 Drawing Sheets

DISPOSABLE OIL CHANGE KIT

RELATED APPLICATIONS

This application is a continuation of U.S. Utility application Ser. No. 14/255,520 filed Apr. 17, 2014; the contents of which are hereby incorporated by reference.

FIELD OF THE INVENTION

The present invention in general relates to the collection, storage and disposal of used and spent liquids, and in particular to a disposable oil change kit for servicing engines.

BACKGROUND OF THE INVENTION

The high cost of owning and maintaining an automobile has led many vehicle owners to drain and change their own oil at home. Typically, the oil change performed by the vehicle owner is done in a haphazard manner, with the vehicle owner utilizing any available household receptacle, such as a bowl or cooking pan, to receive the dirty or spent engine oil. Subsequently, the dirty oil must be disposed of in an ecologically responsible manner into some larger licensed receptacle, thus increasing cost and adding further inconvenience to the procedure. Furthermore, there is greater likelihood of spilling the dirty oil during the oil changing operation using readily available household equipment.

The spilt oil results in driveways and garages being stained. Further, the leakage or spilling of oil results in a significant amount of oil accumulating on the roadways. During rains, the accumulated oil can present a driving hazard to motorists as the oil makes the roadway slick. Additionally, during rains the oil on the driveways and roadways eventually ends up in streams, waterways, and ground water thereby creating a significant environmental problem.

Thus, there exists a need for an economical oil change kit that collects and provides for the disposal of spent or dirty oil in an ecologically safe manner.

SUMMARY OF THE INVENTION

A disposable oil change kit (DOCK) is provided for changing engine oil or other hydrocarbon containing products whereby the spent oil or hydrocarbon is encapsulated in a non-biodegradable substance rendering the kit safe for disposal in a non-hazard or controlled substance landfill. Embodiments of a container for holding spent hydrocarbons and a diffuser for spreading the pooled hydrocarbons may be formed from thin film plastic with one or more socks or pouches filled with an absorbent material such as peat positioned under the diffuser in the container to collect the spent hydrocarbons, thus creating a uniquely designed dispersion tray.

In embodiments, the peat filled socks or pouches are placed in angled layers, an exemplary angle between contacting layers is between forty and ninety degrees (orthogonal) to each other. In a specific embodiment several small peat filled socks are positioned in two non-parallel layers. The layered placement of the peat filled socks allows the oil to have paths (air spaces) to all points in the container box so oil can come in contact with the peat.

The absorbent including but not limited to a non-degradable substance, such as peat moss that has been specially processed, and is capable of absorbing hydrocarbons with total encapsulation is present underneath the diffuser. The peat moss prevents the hydrocarbons from escaping or exhibiting any form of free flow once the encapsulation has occurred. The encapsulation process provided by the absorbent non-degradable substance is what allows the DOCK to be disposed of in a non-hazardous or controlled substance landfill.

DESCRIPTION OF THE INVENTION

Figure 1:
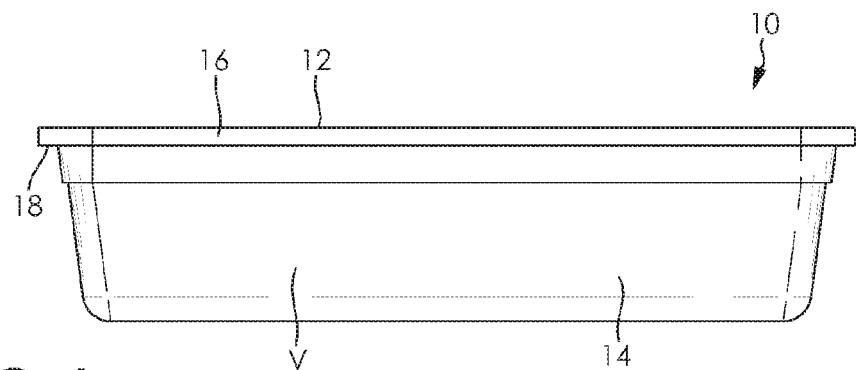
FIG. 1 is a side perspective view of a disposable oil change kit (DOCK) according to an embodiment of the invention.

The present invention has utility as a liquid disposal tool. An inventive liquid disposal tool may be used to collect liquids that drip from equipment over time, or in a particular non-limiting application as a disposable oil change kit (DOCK). Embodiments of the liquid disposal tool absorb a variety of liquids illustratively including spent oil, other hydrocarbon fuel, or combinations thereof in a substance and in specific instances rendering the tool safe for disposal in a non-hazard or controlled substance landfill.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

Embodiments of a container for holding spent hydrocarbons and a diffuser for spreading the pooled hydrocarbons may be formed from plastic, such as thin film plastic with one or more socks or pouches filled with an absorbent material such as peat positioned under the diffuser in the volume of the container to collect the spent hydrocarbons, thus creating a uniquely designed dispersion tray.

In embodiments, the peat filled socks or pouches are placed in layers, ninety degrees to each other. In a specific embodiment several small peat filled socks are positioned in two layers, ninety degrees to each other between layers. The layered placement of the peat filled socks allows the oil to have paths (air spaces) to all points in the container box so oil can come in contact with the peat at all levels in the container. The socks or pouches hold the absorbent material with a permeable material that is similar to tea bags such as, but not limited to filter paper, silk or food grade plastic. Examples of filter paper are those used in fuel filters. The raw material for filter paper used in fuel filters are made of a mixture of hardwood and softwood fibers. The basis weight of the paper is 50-80 g/m². Filter papers for lubrication oils are impregnated to resist high temperatures. The socks or pouches are heat-sealed, and usually has a heat-sealable thermoplastic such as PVC or polypropylene as a component fiber on the inner sock or pouch surface.

The absorbent including but not limited to a non-degradable substance, such as peat moss that has been specially processed and is capable of absorbing hydrocarbons with total encapsulation is present underneath the diffuser in the container. The peat moss prevents the hydrocarbons from escaping or exhibiting any form of free flow once the encapsulation has occurred. The encapsulation process provided by the absorbent non-degradable substance is what allows the DOCK to be disposed of in a non-hazardous or controlled substance landfill.

An absorbent operative herein illustratively includes peat moss; peat moss that has been specially processed and is capable of absorbing hydrocarbons with total encapsulation; cellulosics such as corn cob grit, saw dust, paper, straw, and cotton; clays such as cat litter; synthetic polymers such as polyethylene, polypropylene and polyacrylics. This or other absorbents specific to the liquid to be absorbed is present underneath the diffuser, filling the container. Peat moss prevents the hydrocarbons from escaping or exhibiting any form of free flow once the encapsulation has occurred. Peat moss is a well suited material for absorbing oil because the oil penetrates into the peat core and does not seep from it. In contrast, other conventional absorbents operative herein are either only surface coated (cellulosics such as sawdust or corn cob grit), or becomes softened with the absorption (polyethylene). It is appreciated that some disposal regulations allow for oil that has been encapsulated in an inventive DOCK to be disposed of in a non-hazardous or controlled substance landfill.

The size and spacing of the holes in the diffuser are optimized to account for the physical limitation of the absorption when the liquid is 10/30 weight motor oil is that the oil can only be absorbed from a diameter of about 2 inches. In other embodiments, in order to maximize the rate of absorption and efficiency of the absorbent, various slits or holes are strategically placed in the diffuser.

Figure 2:
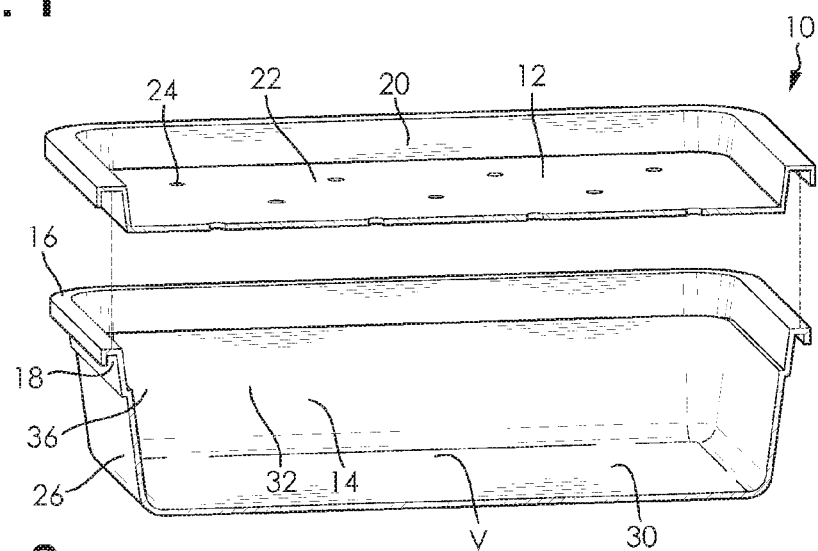
FIG. 2 is a cut away perspective view of the top and side views of the disposable oil change kit of FIG. 1, with a diffuser cover attached to the collection box according to an embodiment of the invention.
Figure 3A:
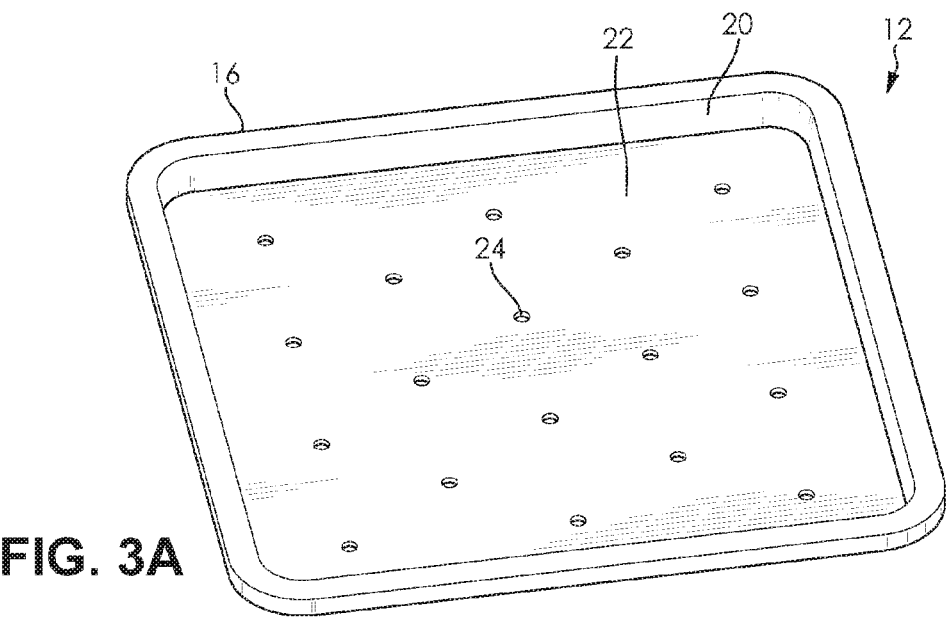
FIG. 3A is a top perspective view of the diffuser cover according to an embodiment of the inventive DOCK.
Figure 3B:
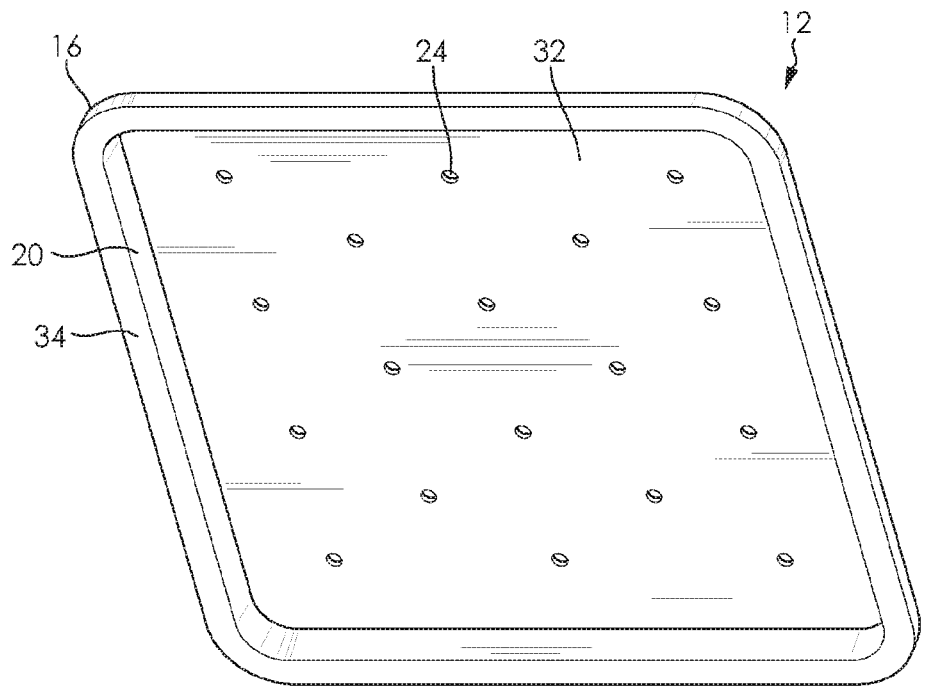
FIG. 3B is a bottom perspective view of the diffuser cover according to an embodiment of the inventive DOCK.

Referring now to the figures, FIG. 1 is a side perspective view of a disposable oil change kit (DOCK) 10 according to an embodiment of the invention. The DOCK 10 has a diffuser 12 with an outer perimeter lip 16 that seals against an upper perimeter lip 18 of a container 14 with a volume V for storing waste or leaking oil from an engine or machinery. The volume V is configured to hold absorbent material that is held in pouches or socks as explained further with respect to FIGS. 5A and 5B. FIG. 2 is a cut away perspective view of the top and side views of the disposable oil change kit 10 of FIG. 1, with a diffuser cover 12 attached to the collection box 14 according to an embodiment of the invention. As shown in FIG. 2, the diffuser 14 has a perimeter wall 20 that contains the oil or lubricant falling on to the top surface 22. The perimeter wall 20 extends downward from outer perimeter lip 16 and terminates at the top surface 22 of the diffuser 12. The bottom 32 of the diffuser 12 rests on a perimeter ledge 36 at the top of the walls 26 of the container 14. Extending from the perimeter ledge 36 is the upper perimeter lip 18 of the container 14. Apertures 24 in the diffuser 12 extend from the top surface 22 to the bottom surface 32. The bottom 30 of the container 14 and the walls 26 define the volume V of the container 14. In a specific embodiment of the inventive DOCK, the volume V is configured to hold up to 8 quarts. FIG. 3A is a top perspective view of the diffuser cover 12 according to an embodiment of the inventive DOCK 10. As shown in FIG. 3B in a bottom perspective view of the diffuser cover 12, the groove 34 in the outer perimeter lip 16 is evident that engages the upper perimeter lip 18 of the container 14.

Figure 4A:
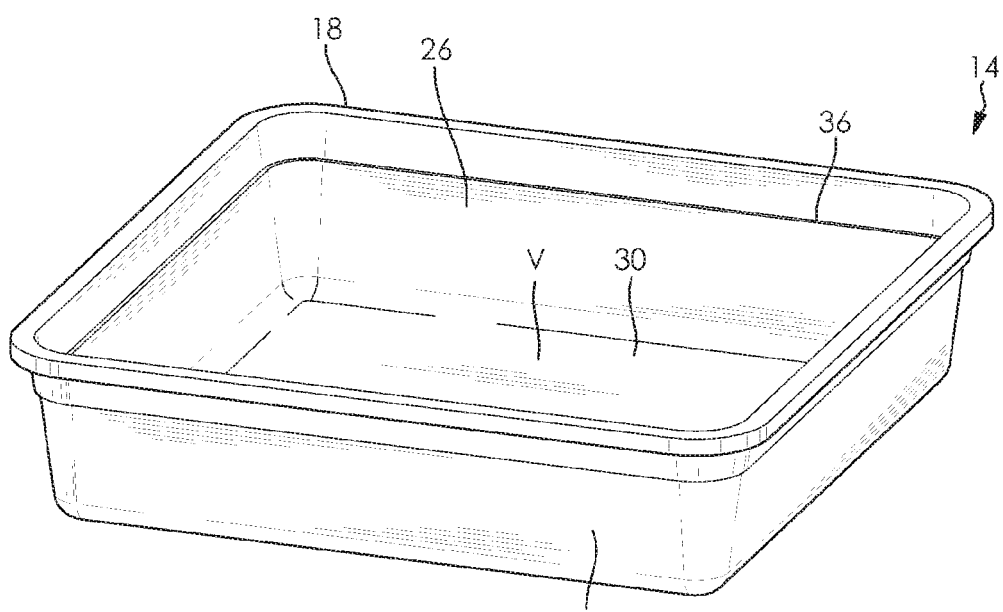
FIG. 4A is a top perspective view of the collection box according to an embodiment of the inventive DOCK.
Figure 4B:
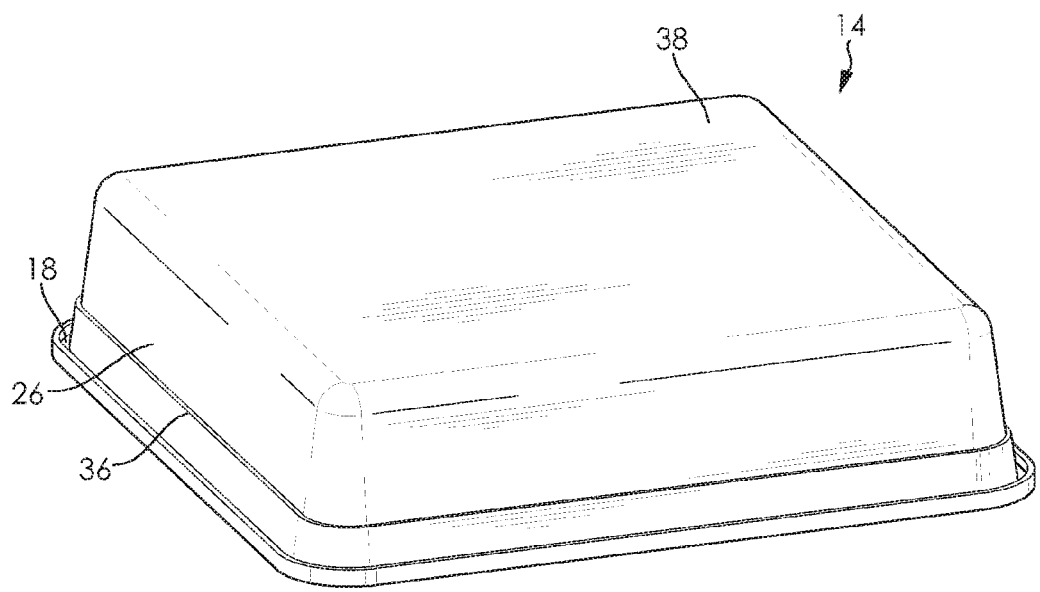
FIG. 4B is a bottom perspective view of the collection box according to an embodiment of the inventive DOCK.

FIG. 4A is a top perspective view of the collection box 14 according to an embodiment of the inventive DOCK 10. In the top view of FIG. 4A the perimeter ledge 36 is clearly seen for lending mechanical support for the diffuser cover 12, and acts as an additional seal to the diffuser cover 12. FIG. 4B is a bottom perspective view of the collection box 14.

In a specific embodiment of the inventive DOCK 10, the bottom 38 and side walls 26 of the container 14 may be made of a clear or translucent plastic to allow a user to gage the extent of fluids that have been absorbed in the DOCK 10. A non-limiting example for the use of a DOCK with a translucent container would be for the placement of DOCKs under leaking valves and fittings. By making the bottom box out of translucent plastic, the plant workers will be able to visually see when it is time to replace the DOCK with a new clean DOCK.

Figure 5A:
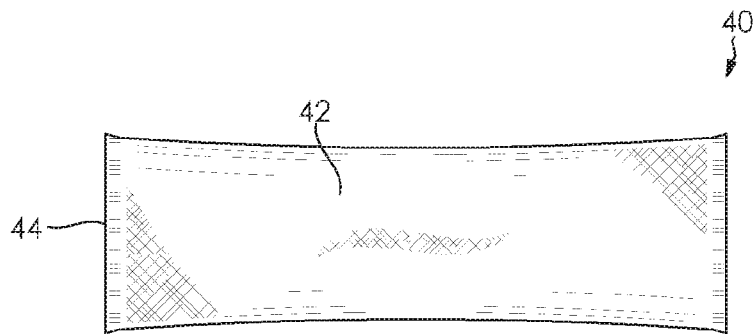
FIGS. 5A and 5B are top and bottom perspective views of the peat filled socks or pouches, respectively according to an embodiment of the invention.
Figure 5B:
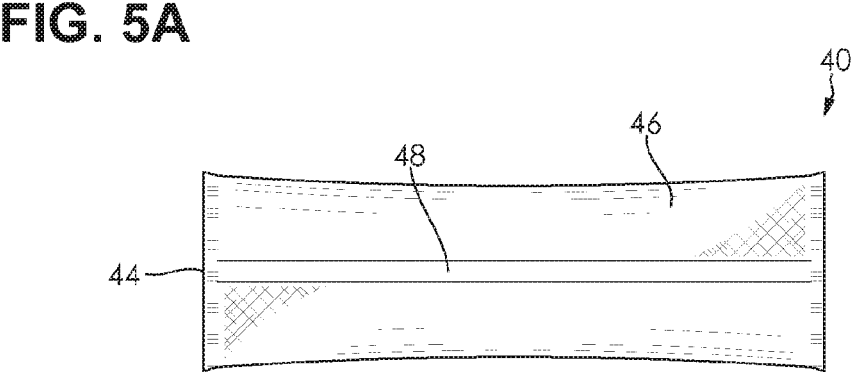

FIGS. 5A and 5B are top and bottom perspective views of the peat filled socks or pouches 40, respectively, according to an embodiment of the invention. The socks or pouches 40 contain the absorbent material within a permeable skin 42. The socks or pouches 40 are sealed along side seams 44, and rear seam 44. Optionally, the absorbent may be treated with microbes that digest the absorbed liquid, such as microbes that digest petroleum based products such as oil absorbent microbes. These are detailed for example in U.S. Pat. No. 5,348,803.

The foregoing description is illustrative of particular embodiments of the invention, but is not meant to be a limitation upon the practice thereof. The following claims, including all equivalents thereof are intended to define the scope of the invention.

The invention claimed is:

1. A liquid disposal tool for the collection and disposal of liquids comprising:
    a container with a bottom portion and walls enclosing a volume, said walls terminating in a top portion with an upper lip;
    an absorbent in a plurality of pouches; said pouches configured in layers and resting on said bottom portion within said walls, said absorbent configured to collect said liquid in said volume; and
    a diffuser covering having an outer perimeter lip surrounding a wall extending above a diffuser top surface, said diffuser adapted to rest on the outer perimeter lip of said absorbent.

2. The liquid disposal tool of claim 1 wherein said container and said diffuser are both made of plastic.

3. The liquid disposal tool of claim 1 wherein said container volume is sized to hold up to 8 quarts of liquid.

4. The liquid disposal tool of claim 1 wherein said absorbent further comprises at least one of sawdust, corn cob, or cat litter.

5. The liquid disposal tool of claim 1 wherein said absorbent further comprises a non-degradable substance.

6. The liquid disposal tool of claim 5 wherein said non-degradable substance is a peat moss capable of absorbing liquids with total encapsulation.

7. The liquid disposal tool of claim 1 wherein the top surface of said diffuser comprises a series of apertures, said series of apertures are configured to maximize the exposure of said liquid to all levels of the container so that said liquid is exposed to the maximum surface area of said absorbent pouches.

8. The liquid disposal tool of claim 1 wherein said absorbent further comprises an oil eating microbe and said absorbent is a non-biodegradable substance that renders said tool safe for disposal in a non-hazard or controlled substance landfill.

9. The liquid disposal tool of claim 1 wherein said pouches are in non-parallel layers.

10. The liquid disposal tool of claim 1 wherein said pouches are configured in non-parallel layers.

11. The liquid disposal tool of claim 1 wherein said pouches are formed with a permeable outer layer enclosing said absorbent.

12. The liquid disposal tool of claim 11 wherein said permeable outer layer comprises filter paper, silk or food grade plastic.

13. The liquid disposal tool of claim 12 wherein said filter paper is made of a mixture of hardwood and softwood fibers.

14. The liquid disposal tool of claim 1 wherein said pouches are heat-sealed with a heat-sealable thermoplastic, said pouches further comprising a PVC or a polypropylene as a component fiber on an inner surface of said pouch.

15. The liquid disposal tool of claim 1 wherein said container is made with a translucent plastic.

16. The liquid disposal tool of claim 1 wherein said diffuser is configured with a series of holes, said holes having a size and spacing that are optimized to account for the physical limitation of the absorption when the liquid is 10/30 weight motor oil.

\* \* \* \* \*